United States Patent [19]

Sasaki et al.

[11] 4,404,992
[45] Sep. 20, 1983

[54] COMPOSITE DUAL TUBING

[75] Inventors: Takesada Sasaki, Machida; Hiroshi Endo, Zama; Yoshimasa Zama, Sagamihara; Masahiko Shiraishi, Nakatsu; Yosinari Miura, Nakatsu; Masayuki Yamaguchi, Nakatsu, all of Japan

[73] Assignee: Nippon Steel Corporation, Tokyo, Japan

[21] Appl. No.: 300,050

[22] Filed: Sep. 8, 1981

[30] Foreign Application Priority Data

Sep. 9, 1980 [JP] Japan ............................. 55-125011
Sep. 10, 1980 [JP] Japan ............................. 55-125845

[51] Int. Cl.³ ............................................. F16L 9/14
[52] U.S. Cl. ................................. 138/140; 138/149; 138/177; 138/178; 60/322
[58] Field of Search ............... 138/111, 113, 114, 148, 138/149, 140, 177, 178; 60/322

[56] References Cited

U.S. PATENT DOCUMENTS 3,434,502  3/1969  Snelling ........................... 138/149
3,850,714  11/1974  Adorjom ......................... 138/149 X
3,980,107  9/1976  Barnes ............................. 138/143
4,287,245  9/1981  Kikuchi ........................... 138/149 X

FOREIGN PATENT DOCUMENTS 1015651  9/1957  Fed. Rep. of Germany ...... 138/149

Primary Examiner—James E. Bryant, III
Attorney, Agent, or Firm—Kenyon & Kenyon

[57] ABSTRACT

The present invention relates to a steel tubing and more particularly a composite dual tubing which can be suitably used for an exhaust pipe capable of effectively decreasing the radiated noise from the exhaust pipe of automobile.

Several known dual tubings are effective occasionally for the reduction of radiated noise, but their effects are drastically reduced at high temperature. A metallic dual tubing of the present invention comprises an inner tube (10) and an outer tube (20) and is, characterized in that the metallic dual tubing is provided with an intermediate layer (18) comprising combustible material filled between the inner tube (10) and the outer tube (20). This layer may be single layer consisting of the combustible material or of the mixture of such material with a heat-resistant material. The intermediate layer may be a dual layer of the combustible material and the heat-resistant material.

8 Claims, 12 Drawing Figures

COMPOSITE DUAL TUBING

The present invention relates to a steel tubing and more particularly a composite dual tubing which can be suitably used for an exhaust pipe capable of effectively decreasing the radiated noise from the exhaust pipe of automobile.

In the automobiles, an exhaust pipe connects the exhaust manifold to the muffler and allows the exhaust gas having a high temperature and a pulsating pressure to pass therethrough. The exhaust pipe radiates therearound noise, which is generated by the mechanical vibration of an internal combustion engine and then transmitted via a flange and the like, as well as the noise which is generated by the vibration of the exhaust pipe itself due to the pulsating exhaust gas. The automobile noises are divided into a group of a power source sounds and a group of travelling sounds. The former group is caused by the engine, the radiator fan, the exhaust gas and the like. The latter group is caused by the rotational contact of tyres with the road, the windage of an automobile body and the like. It is considered that the radiated noise from an exhaust pipe amounts to about 14% of the power source sounds. Research and development of steel tubing for the exhaust pipe proceed, therefore, so as to decrease the radiated noise of the exhaust pipe and hence to provide automobiles with low noises. The material of the exhaust pipe has been devised and the so developed ferritic stainless steel tubing for the exhaust pipe radiates reduced noise as compared with the radiated noise in the case of a carbon steel exhaust pipe. The reduction effect of radiated sound is, however, not satisfactory and the exhaust pipe becomes expensive in the ferritic stainless steel exhaust pipe.

Most conventional exhaust pipes are made of a single steel tube and their soundproof effect is not appreciable, if any. The structure of the exhaust pipe has therefore been devised so as to decrease the radiated noise of such pipes. An example of the so devised and developed exhaust pipes is to use a dual tubing which may be also referred to as a double wall tubing.

The prior art is now described with reference to FIGS. 1 through 6.

Figure 8:
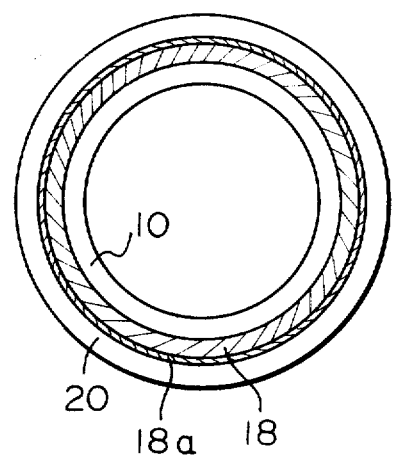
Figure 10:
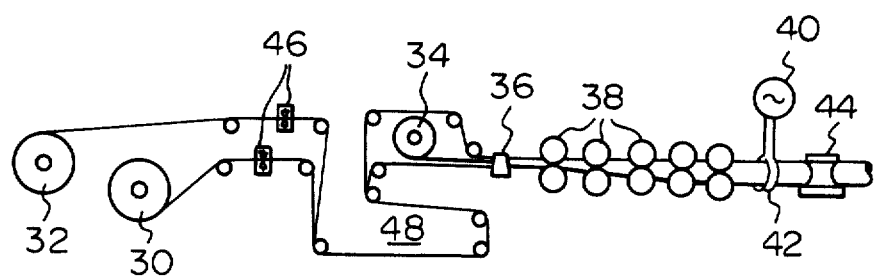
Figure 11:
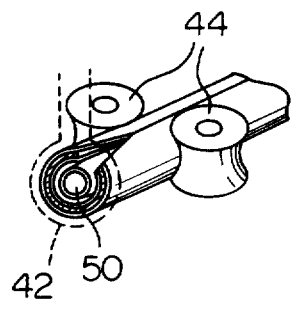
Figure 12:
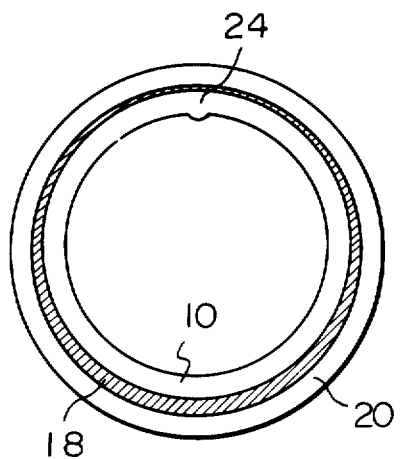

FIG. 10 schematically illustrates a process for manufacturing the composite dual tubing;

FIG. 11 illustrates a part of the process illustrated in FIG. 8, and;

FIG. 12 is a view of the composite dual tubing being manufactured.

Figure 1:
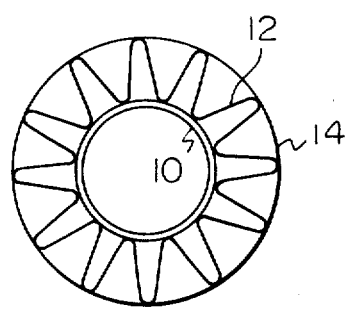
FIGS. 1 through 6 are views of known dual tubings for the exhaust pipe.
Figure 2:
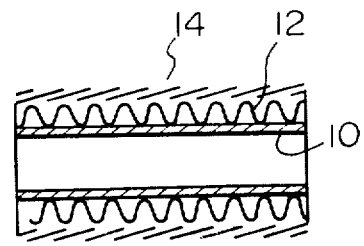
Figure 3:
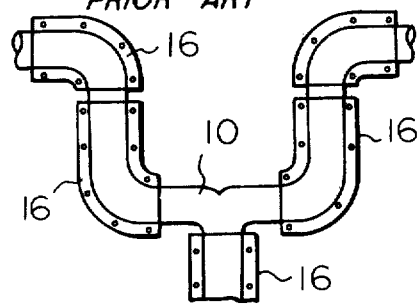
Figure 4:
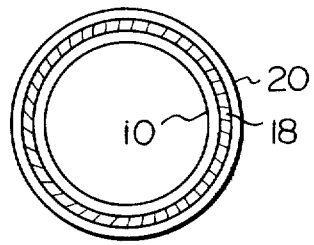
Figure 5:
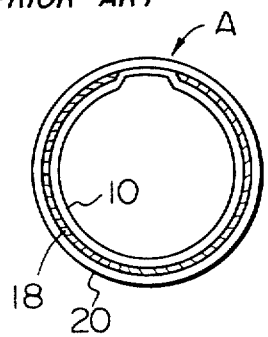
Figure 6:
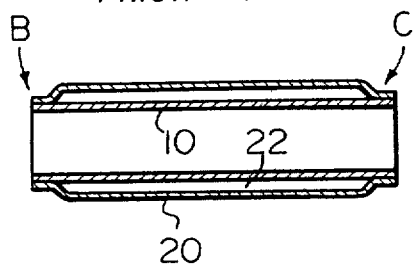

When the single tubing is enclosed by the sound absorbing material or the sound insulating material, the radiated noise can obviously be decreased due to such enclosure as compared with the radiated noise from the exhaust pipe of conventional single tubing. Referring to FIGS. 1 through 3, examples utilizing the noise decreasing effect of the enclosure made of the sound absorbing or insulating material are illustrated. In FIGS. 1 and 2, the reference numerals 10, 12 and 14 designate an inner tube, the sound absorbing or insulating material, such as asbestos and glass fiber, and a cover of an exhaust pipe, respectively. The cover 14 in FIG. 1 is embodied as a sheet and is elastic, while the cover in FIG. 2 is embodied as an armor like member. In order to satisfactorily decrease the noise by the composite dual tubings shown in FIGS. 1 and 2, the sound absorbing or insulating material 12 must be very thick, so that the whole tubings become disadvantageously bulky. In addition, it is complicated to attach the sound absorbing or insulating material around the inner tube 10, because the exhaust pipe is curved. Namely, when the attachment of sound absorbing or insulating material is carried out by a winding method, the material must be manually wound around the inner tube and therefore this method is not likely to be adapted in the mass production of composite dual tubings. As shown in FIG. 3, a method other than manual winding can be employed for attaching the sound absorbing or insulating material around the inner tube 16. In the method illustrated in FIG. 3, five half sections 16 of the sound absorbing or insulating material are shown. A pair of the upper and lower half sections are mounted on the inner tube 10 from both sides of the inner tube and then secured to each other by screws at dot points of a flange of these sections, as shown in FIG. 3. The workability of this method is higher than the winding method of the sound absorbing or insulating material. However, in the method illustrated in FIG. 3, half sections 16 must be provided in straight, curved or various shapes adapted to the shape of an exhaust pipe and must be selectively attached to the respective regions of the exhaust pipe. This is a still complicated work of the method illustrated in FIG. 3. The dual tubings are advantageous in this regard, because they can be mounted as exhaust pipes as simply as the single wall tubings. The dual tubings shown in FIGS. 4 and 5 are composite tubings with an insert 18 between the inner tube 10 and the outer tube 20. The composite dual tubing shown in FIG. 5 is different from that shown in FIG. 4 in the fact that the inner tube 10 and the outer tube 20 are directly in contact and secured or welded to one another at the portion A. The tubing shown in FIG. 6 is a dual tubing with a gap 22 which separates the inner tube 10 from the outer tube 20, and both tubes 10, 20 are secured to one another through portions B, C at the ends of the tubing. The dual tubings shown in FIGS. 5 and 6 turned out by the test by the present applicant to be effective occasionally for the reduction of radiated noise. However, such effect is drastically decreased when heating the dual tubings to a high temperature. The reduction effect of radiated noise by the dual tubing shown in FIG. 6 is only slightly thermally influenced, however, its reduction effect is not remarkable in the first place. In addition, since the inner and outer tubes must be secured to one another at the ends thereof or at an appropriate intermediate point between the ends, so as to prevent the inner tube from falling out of the outer tube during the tube handling, the working of tubes is disadvantageously complicated. Furthermore, when the dual tubing is subjected to bending, the inner and outer tubes are deformed so that the gap 22 may not be assured. In order to eliminate such problem, sand and the like are usually filled in the gap and then withdrawn from the gap after working of the tubes, which is a very complicated method. In this regard, the composite dual tubings shown in FIGS. 4 and 5 comprise the insert 18, which is filled between the tubes, and thus can be subjected to bending without a danger of causing direct contact between the inner and outer tubes. However, as stated above, these composite dual tubings involve a problem in a drastic reduction of the radiated sound-reduction effect at a high temperature.

It is, therefore, an object of the present invention, to improve the known tubings, so that the radiated noise from the composite dual tubing can be kept at a low level at normal temperature and especially at high temperature. The composite dual tubing according to the present invention must be manufactured by a simple and reliable method.

In accordance with the objects of the present invention, there is provided a metallic dual tubing comprising an inner tube and an outer tube, characterized in that the metallic dual tubing is provided with an intermediate layer comprising combustible material filled between the inner tube and the outer tube.

The preferred embodiments of the present invention are hereinafter described with reference to FIGS. 7 through 10.

Figure 7:
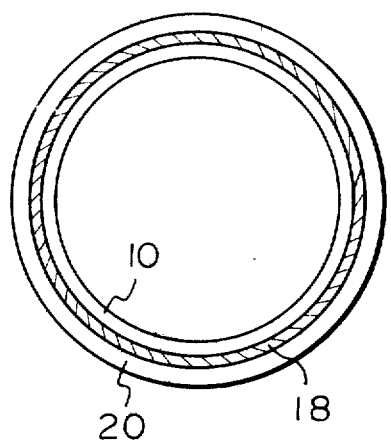
FIGS. 7, 8 and 9 illustrate views of the composite dual tubing according to embodiments of the present invention.

Referring to FIG. 7, a preferred embodiment of the composite dual tubing according to the present invention is illustrated. In FIG. 7, the insert 18 is made of combustible material and filled between the inner tube 10 and the outer tube 20. The insert 18 is hereinafter referred to as the combustible material layer. The combustible material layer 18 preferably has a thickness of from about 0.1 to 0.5 mm.

Referring to FIG. 8 is illustrated in another preferred embodiment, wherein the intermediate layer is a dual layer consisting of a combustible material layer and a heat-resistant material layer. The heat-resistant material layer is denoted by the reference numeral 18a.

The combustible material layer 18 (FIGS. 7 and 8) consists of the material combustible at a temperature, to which, for example, the exhaust pipe is heated. For the tubing as the exhaust pipe, such materials as synthesized resin, and an appropriately treated paper and pulp, which are combustible at a temperature in the range of from 600° to 800° C., can be used. The heat-resistant material layer 18a consists of a material not burnt away at a temperature to which, for example, the exhaust pipe is heated. For the tubing to be used as the exhaust pipe such materials as glass cloth and asbestos can be used. The heat-resistant material layer 18a has preperably a thickness of from 0.1 to 0.5 mm. The combustible material layer 18 (FIG. 8) has preferably thickness of from 0.1 to 0.5 mm.

The composite dual tubings shown in FIGS. 7 and 8 may be shipped from the tubing manufacturer with or without the combustible material layer 18. Namely, the composite dual tubings, in which the combustible material is not yet burnt away, may be shipped and then subjected by a purchaser to bending, cutting and securing flanges around the outer tube thereby adapting the composite dual tubings to the machine and apparatus, to which such tubings are attached. The composite dual tubings are then heated and the combustible material layer 18 is burnt away, when the machine and apparatus is put into operation. The smoke and other vapors generated by heating can be discharged or emitted via the end of the composite dual tubing attached to the machine and apparatus by means of the flanges formed on the outer tube, at which end the combustible material layer is or has been exposed. The combustible material layer may be intentionally burnt by a burner at an appropriate stage after bending. After burning away the combustible material layer, a gap is formed between the inner tube 10 and the outer tube 20 in the composite dual tubing shown in FIG. 7, while the space between the inner and outer tubes is filled with the heat-resistant material layer 18a in the composite dual tubing shown in FIG. 8. The gap formed between the inner and outer tubes of the composite dual tubing shown in FIG. 7 is however difficult to detect with the naked eye, because the dimensions of the gap corresponds to the thickness of the combustible material intermediate layer and is very small, e.g. from 0.1 to 0.5 mm. In the composite dual tubing shown in FIG. 8, the heat-resistant material layer 18a spreads somewhat upon the burning away of the combustible material layer 18.

Figure 9:
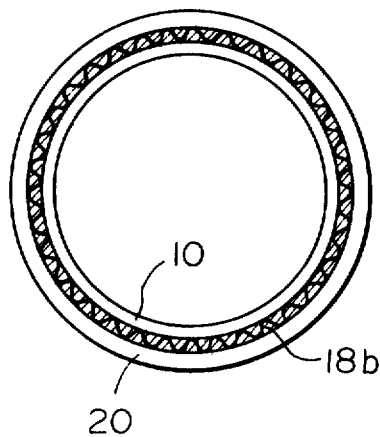

Referring to FIG. 9, another preferred embodiment of the composite dual tubing is illustrated and this tubing is also provided with an intermediate layer comprising combustible material. In this preferred embodiment, the intermediate layer consists of a mixture of heat-resistant material with the combustible material. The intermediate layer mentioned above is denoted in FIG. 9 by 18b and is hereinafter referred to as the intermediate layer mixture 18b. The proportion of the combustible material to the intermediate layer mixture 18b is from 50 to 60% by volume. The heat-resistant material may be an inorganic material, such as rock wool, and the combustible material may be resin, such as polyethylene, acryl and nylon. The intermediate layer mixture 18b is, for example, a mixture of pulp with either glass cloth, ceramic fiber or potassium titanate and is in the form of a sheet, in which the glass cloth and the like are agglomerated by means of the pulp. The intermediate layer mixture 18b may have a thickness of from about 0.2 to 1.0 mm. The combustible material of the intermediate layer mixture 18b is burnt away upon heating, when, for example, a high temperature exhaust gas flows through the composite dual tubing used for the exhaust pipe of automobiles. After heating the heat-resistant material is left unburned.

A method for manufacturing the composite dual tubing according to the present invention is now described.

Referring to FIG. 10, the manufacturing method according to the electric tube-welding technique is illustrated. The manufacturing plant is provided with uncoilers 30 and 32 of strips for the outer and inner tubes, respectively, an uncoiler 34 of the intermediate layer, guide rolls 36, forming rolls 38, a high frequency-power source 40, a welding coil 42, squeezing rolls 44, a welding assembly 46 for a continuous supply of the strips, and a looper 48 which can supply the strips even during welding. The strips for the inner and outer tubes are drawn out from the uncoilers 32 and 30, respectively. The material for intermediate layer is drawn out from the uncoiler 34 and is fed into the space between these strips. The strips and the material for the intermediate layer are bent into the tubular form by the forming rolls 38 and subjected to a high frequency induction-heating by means of the welding coil 42. The high frequency induction-heated steel edges are bonded or welded, while the strips are being pressed by the squeezing rolls 44. The strips are welded as illustrated in FIG. 11. The reference numeral 50 designates an impedor for decreasing the wattless current, made of ferrite and the like. The composite dual tubing as manufactured by the continuous method as illustrated in FIGS. 10 and 11 and welded at 24 may have the cross section as shown in FIG. 12.

The thickness of the intermediate layer (the combustible material layer, the heat-resistant material layer or the intermediate layer mixture) is the thickness of the layer not before but after manufacture of the composite dual tubings. When the combustible for heat-resistant material is compressed during the manufacture of composite dual tubings, the thickness of this material must be so selected that the required thickness can be obtained in the completed tubings. The thicknesses of the inner and outer tubes may be equal to one another. However, the outer tube should be of larger thickness than the inner tube, considering the fact that flanges are welded on the outer tube.

Not only the methods described above but any optional method for manufacturing the composite tubings can be utilized for manufacturing the composite dual tubing according to the present invention.

The present invention is further explained by way of Examples.

EXAMPLE 1

In the table below illustrated are the results of testing the steel tubings of according to the present invention numbered as Nos. 4 through 13 and other steel tubings acting as comparative samples numbered as Nos. 1, 2, and 3. The steel tubings were dual tubings except that the steel tubing of sample No. 1 was a singe or single wall tubing with a diameter of 65 mm and wall thickness of 2.4 mm. The diameter of the dual tubings according to Sample Nos. 2 through 11 was 65 mm and the wall thickness of the inner and outer tubes of these dual tubings was 1.2 mm. The diameter of the dual tubings according to Sample Nos. 12 and 13 was 89.1 mm, and the wall thicknesses of the outer and inner tubes were 1.6 mm and 1.0 mm, respectively.

The test for measuring the radiated noise from the tubings was carried out as follows. The tubings having a length of 1000 mm were held at their ends by a carrying member comprising a chuck and a pivot. The steel balls were placed in the tubings and struck the inner wall of the tubings, while the tubings were caused to rotate by means of the supporting member. The radiated sound was measured by a sound level meter located near the tubings. The test was carried out at room temperature indicated in the table by "As Roll" and at elevated temperature of 600° C., 700° C. and 800° C.

2 was 95.5 dB, and the noise at elevated temperatures became higher. This is believed to be because the inner and outer tubes were in contact with one another at some parts thereof.

In Sample No. 3 the intermediate layer consisted exclusively of heat-resistant material and was inserted in the annular space between the inner and outer tubes so that 80% of the circumferential length was filled by the intermediate layer. The sound pressure level was low at "As Roll" but became high at 600° C. and higher.

The sound pressure level of Samples Nos. 4 and 5 according to the present invention was high at "As Roll" but was reduced to the level of from 89 to 91 dB at elevated temperatures where the combustible materials, i.e. paper and synthetic resin, were burnt away. The sound pressure level of Sample No. 6 according to the present invention was low at both "As Roll" and elevated temperatures.

In Sample Nos. 7 and 8, the thickness of the combustible intermediate layer was thicker than the preferable thickness, and the sound pressure level was high but was lower than in the single tubing (Sample No. 1).

Sample No. 9 of the present invention exhibited the best low noise-radiation property.

The above described results can be summarized as follows.

The sound pressure level is high at elevated temperatures, when the intermediate layer is heat-resistant and thus fills densely the annular gap (Sample No. 3). Even when the intermediate layer comprises the combustible material, a too thin layer of such material (Sample Nos. 10 and 11) and a too thick layer (No. 8) are not most desirable. Good results are obtained by using the intermediate layer comprising the combustible material and heat-resistant materials, and by selecting the thickness of the material layer(s) in an appropriate range. Samples according to the present invention were characterized as compared with the other Samples by low radiated noise at elevated temperatures according to the characteristic of the present invention was very significant since the exhaust pipe flowing a high temperature gas therethrough was heated to a high temperature of from

TABLE 1

| No. | | Intermediate Layer | | Sound Pressure Level by Internally Vibrating (dB) | | | |
|---|---|---|---|---|---|---|---|
| | | Material (s) | Thickness (mm) | As Roll | 600° C. | 700° C. | 800° C. |
| 1 | (comparative) | — | — | 105 | 104 | 104 | 104.5 |
| 2 | (comparative) | none | — | 95.5 | 97 | 96 | 98 |
| 3 | (comparative) | Glass Cloth | 0.2 | 91.5 | 98 | 97 | 97 |
| 4 | (invention) | Paper | 0.2 | 94.5 | 90 | 89 | 91 |
| 5 | (invention) | Synthetic Resin Glass Cloth | 0.4 | 98 | 90 | 90 | 90.5 |
| 6 | (invention) | Synthetic Resin Glass Cloth | 0.4 0.2 | 91 | 87 | 86 | 86 |
| 7 | (invention) | Synthetic Resin Glass Cloth | 0.4 0.7 | 97.5 | 96 | 95.5 | 97 |
| 8 | (invention) | Paper Glass Cloth | 0.6 0.2 | 100 | 95.5 | 96 | 98 |
| 9 | (invention) | Paper Ceramic Fiber | 0.2 0.5 | 90 | 86 | 86 | 86.5 |
| 10 | (invention) | Paper | 0.06 | 96 | 94 | 94.5 | 94 |
| 11 | (invention) | Synthetic Resin | 0.05 | 98 | 96.5 | 95 | 94 |
| 12 | (invention) | Synthetic Resin Glass Cloth | 0.2 0.2 | 92 | 90.5 | 90.5 | 91 |
| 13 | (invention) | Synthetic Resin Glass Cloth | 0.1 0.2 | 92.5 | 92 | 91 | 92 |

As is apparent from the table above, the noise from the single tubing of Sample 1 was the highest. Sample 2 for the comparison purpose was not provided with an intermediate material. The noise as "As Roll" of Sample 600° to 800° C.

EXAMPLE 2

The procedure of Example 1 was repeated to test the composite dual tubings with the intermediate layer mixture. The diameter of the composite dual tubings of Sample Nos. 14 through 19 given in Table 2 was 65 mm and the wall thickness of the inner and outer tubes was 1.2 mm. The diameter of the composite dual tubings of Samples Nos. 20 through 25 was 89.1 mm and the thicknesses of the outer and inner tubes were 1.6 mm and 1.0 mm, respectively.

TABLE 2

| Sample Nos. | Intermediate Layer Mixture | | | Sound Pressure Level by Internally Vibrating (dB) | | | |
|---|---|---|---|---|---|---|---|
| | Heat Resistant Material | Combustible Material | Thickness of Layer (mm) | As Roll | 600° C. | 700° C. | 800° C. |
| 1 (Comparative) | none | none | — | 105 | 104 | 104 | 104.5 |
| 2 (Comparative) | none | none | — | 95.5 | 97 | 96 | 98 |
| 14 (Comparative) | Glath Cloth | Polyester: 20% | 0.2 | 91.5 | 98 | 97 | 97 |
| 15 (Comparative) | Ceramic Fiber | Paper: 30% | 0.5 | 90.5 | 95.5 | 95 | 95.5 |
| 16 (Invention) | Ceramic Fiber | Paper: 50% | 0.5 | 91.5 | 92 | 92 | 91.5 |
| 17 (Invention) | Ceramic Fiber | Paper: 60% | 0.5 | 92 | 89 | 87 | 87.5 |
| 18 (Invention) | Asbestos | Polyester: 60% | 0.7 | 95 | 87 | 85 | 85 |
| 19 (Invention) | KTiO2 | Paper: 60% | 0.25 | 96 | 87 | 87 | 88 |
| 20 (Invention) | Ceramic Fiber | Paper: 50% | 1.0 | 97 | 93 | 94.5 | 93.5 |
| 21 (Invention) | Ceramic Fiber | Paper: 50% | 0.5 | 95 | 86 | 85 | 87 |
| 22 (Comparative) | Ceramic Fiber | Paper: 30% | 0.5 | 91 | 96 | 96.5 | 96 |
| 23 (Comparative) | Ceramic Fiber | Paper: 50% | 0.1 | 92 | 95.5 | 95 | 96.5 |
| 24 (Comparative) | Ceramic Fiber | Paper: 50% | 1.2 | 91 | 94.5 | 95 | 97 |
| 25 (Invention) | Ceramic Fiber | Polyester: 60% | 0.5 | 94 | 88 | 88 | 88 |

In Table 2, above, Sample Nos. 1 and 2 of Example 1 an given so as to facilitate the comparison of the composite dual tubings having the intermediate layer mixture with the single tubing (No. 1) and the dual tubing (No. 2).

In Sample Nos. 14 and 15, the noise reduction property was good at "As Roll" but inferior at elevated temperatures. This was because the proportion of the combustible material to the heat-resistant material was low. Sample Nos. 16 through 21 and 25, in which the amount of the combustible material was from 50 to 60% by volume, radiated a low level of noise at elevated temperatures, where the combustible material was burnt away, although the noise reduction property at "As Roll" was inferior in Sample Nos. 19 and 20. Although in Sample No. 23, the amount of the combustible material was 50%, the noise increased at elevated temperatures. This was because the intermediate layer mixture was thin. The noise of Sample No. 23 at elevated temperatures was high. This was because the intermediate layer mixture was thin.

The low noise radiation of the composite dual tubing according to the embodiments shown in FIGS. 7 and 8 can be explained as follows. The heat-resistant material layer and the gap generated as a result of burning away the combustible material have a function of the vibration attenuator or vibration damper and attenuates or damps the vibration of the inner and outer tubes. Namely, when the inner and outer tubes vibrate, the heat-resistant layer is caused to slide or frictionally be displaced with respect to the tubes, with the consequence that the vibration of the tubes is damped. In addition, when the inner and outer tubes vibrate, the gap generated as a result of burning away of the combustible material is caused to expand or shrink, with the consequence that the vibration of the tubes is damped. The heat-resistant layer and the gap mentioned above do not only have the sound absorbing and sound insulation function as the conventional tubings shown in FIGS. 1 through 3 but also have the sound damping effect which effectively decreases the radiated noise at elevated temperatures. In addition, since the vibration of the tubings is suppressed, it is possible to suppress the noise, which results from vibration of the exhaust pipe due to the pulsating exhaust gas as well as the noise, which results from the engine vibration transmitted to and radiated from the exhaust pipe. The vibration damping by the heat-resistant layer is realized by deformability of the layer. If the heat-resistant intermediate layer were too compactly inserted between the inner and outer tubes under pressure to deform, the inner and outer tubes would be integrally combined with one another and thus would not be different from single tubing from the point of view of vibration. This could elucidate the reason why the composite dual tubings shown in FIGS. 4 and 5 do not exhibit a low noise radiation property. In this regard, the combustible material intermediate layer is burnt away when the composite dual tubing is heated at, for example, 600° to 800° C. using the tubing as the exhaust pipe, which results in the loosely filled and thus deformable state of the heat-resistant material layer in the annular gap. Since the gap is created by burning away the combustible material, in the case where the intermediate layer consists only of the combustible material, and also since the heat-resistant material layer is loosely filled in the annular space, the inner and outer tubes seem to vibrate independently of each other. In addition, the inner and outer tubes may be in contact with each other during the vibration in the former case. As a result of the independent vibration and the contact between the inner and outer tubes the vibration damping seems to be satisfactory.

If the intermediate layer is very thin, the vibration of the composite dual tubings seems to be equivalent to that of the dual tubings which are provided with no intermediate layer. On the other hand, when the intermediate layer is very thick, the inner and outer tubes are so isolated that they are vibrated independently of each other, which seems to result in non satisfactory vibration-damping. The composite dual tubing with the intermediate layer may be subjected to bending, without resulting in direct contact between the tubes which contact would prevent the independent vibration of the inner and outer tubes. Since the combustible material is burnt away after bending, direct contact is not caused by the bending.

The low noise-radiation of the composite dual tubing shown in FIG. 9 can be explained by the vibration damping explained with regard to the composite dual tubings shown in FIGS. 7 and 8. The combustible material of the intermediate layer mixture is burnt away due to heating by, for example, the exhaust gas of automobiles, and therefore the intermediate layer is provided with a deformability or is in a loosely filled state.

The intermediate layer mixture may therefore be strongly compressed between the inner and outer tubes during the manufacturing of the tubings, because the heat-resistant material of this mixture is later filled loosely between the inner and outer tubes.

The composite dual tubing according to the present invention can be used for not only the exhaust tabe but also any vibration-damping purpose.

We claim:

1. An exhaust pipe for discharging hot gases from an internal combustion engine comprising:
   a metallic dual tubing having an inner tube spaced from an outer tube;
   an intermediate layer filling the space between the inner tube and the outer tube;
   said intermediate layer comprising a combustible material which combusts at the temperature of the hot gases to be discharged from said engine;
   whereby upon exposing said exhaust pipe to said temperature of the hot gases to be discharged said combustible material combusts thereby providing a gap between said inner and outer tube.

2. An exhaust pipe according to claim 1, wherein the thickness of said intermediate layer is in the range of from about 0.1 to 0.5 mm.

3. An exhaust pipe according to claim 1, characterized in that
   said intermediate layer is a dual layer consisting of a combustible material layer and a heat-resistant material layer.

4. An exhaust pipe according to claim 3, wherein the thickness of said combustible material layer is in the range of from about 0.1 to 0.5 mm.

5. An exhaust pipe according to claim 3 or 4, wherein the thickness of said heat-resistant material layer is in the range of from about 0.1 to 0.5 mm.

6. An exhaust pipe according to claim 1 characterized in that said intermediate layer consists of a mixture of heat-resistant material with combustible material and has a thickness in the range of from about 0.2 to 1.0 mm, the proportion of the combustible material to the intermediate layer mixture being from 50 to 60% by volume.

7. An exhaust pipe according to claim 3 or 6, wherein said heat-resistant material is glass cloth, ceramic fiber or rock wool.

8. An exhaust pipe according to claim 1, 3, or 5, wherein said combustible material is synthetic resin or paper.

* * * * *